(12) United States Patent
Heo et al.

(10) Patent No.: US 9,479,360 B2
(45) Date of Patent: Oct. 25, 2016

(54) RECEIVER APPARATUS AND RECEPTION METHOD IN WIRELESS COMMUNICATION SYSTEM

(71) Applicant: Samsung Electronics Co., Ltd., Gyeonggi-do (KR)

(72) Inventors: Seok-Joong Heo, Seoul (KR); Soo-Bok Yeo, Gyeonggi-do (KR); Jin-Hyun So, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/753,650

(22) Filed: Jun. 29, 2015

(65) Prior Publication Data

US 2015/0381390 A1 Dec. 31, 2015

Related U.S. Application Data

(60) Provisional application No. 62/018,072, filed on Jun. 27, 2014.

(30) Foreign Application Priority Data

Sep. 5, 2014 (KR) .................. 10-2014-0118975

(51) Int. Cl.
*H04L 25/02* (2006.01)
*H04B 7/01* (2006.01)
*H04L 25/03* (2006.01)

(52) U.S. Cl.
CPC ......... *H04L 25/0226* (2013.01); *H04L 25/025* (2013.01); *H04L 25/0232* (2013.01); *H04B 7/01* (2013.01); *H04L 2025/03605* (2013.01)

(58) Field of Classification Search
CPC .............. H04L 25/03057; H04L 25/0256
USPC .......................... 375/229, 230, 232
See application file for complete search history.

(56) References Cited

U.S. PATENT DOCUMENTS

| 7,085,317 | B2 | 8/2006 | Malladi et al. |
| 7,929,597 | B2 | 4/2011 | Mergen et al. |
| 8,615,200 | B2 | 12/2013 | Malladi et al. |
| 8,958,387 | B2 * | 2/2015 | Iwasaki .................. 370/330 |
| 9,071,473 | B2 * | 6/2015 | Yepez ............... H04L 25/0222 |
| 2003/0227866 | A1 | 12/2003 | Yamaguchi |
| 2004/0203812 | A1 | 10/2004 | Malladi et al. |
| 2005/0174189 | A1 * | 8/2005 | Jin et al. .................. 333/28 R |
| 2006/0029164 | A1 | 2/2006 | Hwang |
| 2006/0098766 | A1 | 5/2006 | Pietraski et al. |
| 2006/0146926 | A1 * | 7/2006 | Bhoja et al. .............. 375/233 |

(Continued)

FOREIGN PATENT DOCUMENTS

JP 2006-311385 11/2006

*Primary Examiner* — Kevin M Burd
(74) *Attorney, Agent, or Firm* — The Farrell Law Firm, P.C.

(57) ABSTRACT

A terminal including a transmitter and a receiver is provided. The receiver includes a pilot detection unit configured to detect a pilot signal from a received signal; a low-pass filter configured to filter noise from the pilot signal; a channel equalizer configured to perform channel equalization for data of the received signal, based on the filtered pilot signal; and a channel estimation controller configured to adaptively adjust at least one of a coefficient and an order of the low-pass filter, wherein the coefficient of the low-pass filter is controlled according to characteristics of the pilot signal, and the order of the low-pass filter is controlled according to transmission characteristics of the data of the received signal.

16 Claims, 13 Drawing Sheets

(56) References Cited

U.S. PATENT DOCUMENTS

| | | | |
|---|---|---|---|
| 2007/0091995 A1* | 4/2007 | Ibragimov et al. | 375/233 |
| 2007/0110201 A1 | 5/2007 | Mergen et al. | |
| 2007/0127557 A1 | 6/2007 | Subrahmanya et al. | |
| 2007/0202824 A1 | 8/2007 | Malladi et al. | |
| 2008/0049814 A1* | 2/2008 | Jeon | 375/147 |
| 2011/0038407 A1 | 2/2011 | Ki et al. | |
| 2012/0076193 A1 | 3/2012 | Kolze et al. | |
| 2014/0036983 A1 | 2/2014 | Ito et al. | |
| 2014/0064348 A1* | 3/2014 | Braz | H04B 1/12 375/227 |
| 2015/0109530 A1* | 4/2015 | Zhang | H03H 17/04 348/536 |

* cited by examiner

RECEIVER APPARATUS AND RECEPTION METHOD IN WIRELESS COMMUNICATION SYSTEM

PRIORITY

This application claims priority under 35 U.S.C. §119 to U.S. Provisional Patent Application Ser. No. 62/018,072, filed on Jun. 27, 2014 in the U.S. Patent and Trademark Office, and Korean Application Serial No. 10-2014-0118975, filed on Sep. 5, 2014 in the Korean Intellectual Property Office, the entire content of which is incorporated herein by reference.

BACKGROUND

1. Field of the Disclosure

The present disclosure relates generally to a receiver and a reception method in a wireless communication system and, more particularly, to an apparatus and method for performing channel estimation using a Low-Pass Filter (LPF) capable of adaptively adjusting its filter order and bandwidth in a wireless communication system.

2. Description of the Related Art

With the standardization and commercialization of high-speed mobile communication systems such as Wideband Code Division Multiple Access (WCDMA) and High Speed Downlink Packet Access (HSDPA), various types of equalizer-based receivers suitable for high-speed reception have been studied and developed. An equalizer-based receiver includes a channel estimator that estimates a channel and an equalizer that performs channel equalization using the estimated channel. The equalizer selects a weight to improve a Signal to Noise Ratio (SNR) and compensate for multipath interference and Inter Symbol Interference (ISI). The equalizer corrects distortion and generates an estimate of a transmitted symbol. Since a weight for channel equalization is generated from an estimated channel, the overall system performance may depend on the accuracy of the estimated channel and a method of generating the weight of channel equalization.

In general, a LPF eliminates noise by adjusting a bandwidth of a passband according to a bandwidth of a signal delivered thereto, and conventionally a method of eliminating noise using a first-order LPF has been used. For example, noise components other than a noise component within a bandwidth of a pilot signal for channel estimation may be eliminated through a first-order LPF.

However, when a first-order LPF is used, noise components cannot be efficiently eliminated as compared to a higher-order LPF, because a transition width interval is relatively larger than that of a higher-order LPF and a transfer function of the first-order LPF filter has a gentle slope in a transition width, which may cause performance degradation.

In contrast, a higher-order LPF (e.g., an order higher than that of a first-order LPF) may have larger group delay than a first-order LPF. Group delay refers to a time from when a signal is input into an LPF to when the signal is output from the LPF.

In the related art, only a first-order LPF is used because group delay cannot be adaptively compensated for in a higher-order LPF, and thus the filtering performance degrades in an environment in which lots of noise is present or a Doppler spread is large.

SUMMARY

The present disclosure has been made to provide a channel estimation apparatus and method using an adaptive Low-Pass Filter (LPF).

Accordingly, an aspect of the present disclosure is to provide an apparatus and method for compensating for group delay, which may occur when a higher-order LPF is used, using an input signal delay unit and a delay buffer.

Another aspect of the present disclosure is to provide an apparatus and method for performing channel estimation using an LPF capable of adaptively adjusting its filter order and bandwidth in a wireless communication system, thereby improving channel estimation performance.

In an embodiment of the present disclosure, a terminal including a transmitter and a receiver is provided. The receiver includes a pilot detection unit configured to detect a pilot signal from a received signal, a low-pass filter configured to filter noise from the pilot signal, a channel equalizer configured to perform channel equalization for data of the received signal, based on the filtered pilot signal and a channel estimation controller configured to adaptively adjust at least one of a coefficient and an order of the low-pass filter, wherein the coefficient of the low-pass filter is controlled according to characteristics of the pilot signal, and the order of the low-pass filter is controlled according to transmission characteristics of the data of the received signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Hereinafter, various embodiments of the present disclosure are described in detail with reference to the accompanying drawings. Further, in the following description of the present disclosure, a detailed description of known functions and configurations incorporated herein is omitted when it may obfuscate the subject matter of the present disclosure. Further, the terms as described below are defined in consideration of the functions in the present disclosure and may vary according to the intentions of users or operators or according to the practices of the related art. Accordingly, the definitions of the terms should be made on the basis of the overall context of the present disclosure.

Reference is now made to a channel estimation apparatus and method for a receiver in a wireless communication system according to an embodiment of the present disclosure. In particular, various embodiments of the present disclosure propose a receiver and a reception method using a channel estimator, in which a higher-order low-pass filter is included, and an equalizer.

Various embodiments of the present disclosure may be applied to a receiver structure in a mobile communication system requiring high-speed data transmission, such as a Wideband Code Division Multiple Access (WCDMA) or High Speed Downlink Packet Access (HSDPA). However, it will be apparent to those skilled in the art that an embodiment of the present disclosure is not limited to a WCDMA or HSDPA system and may be used in any other type of receiver using a channel estimator and an equalizer.

Figure 1:
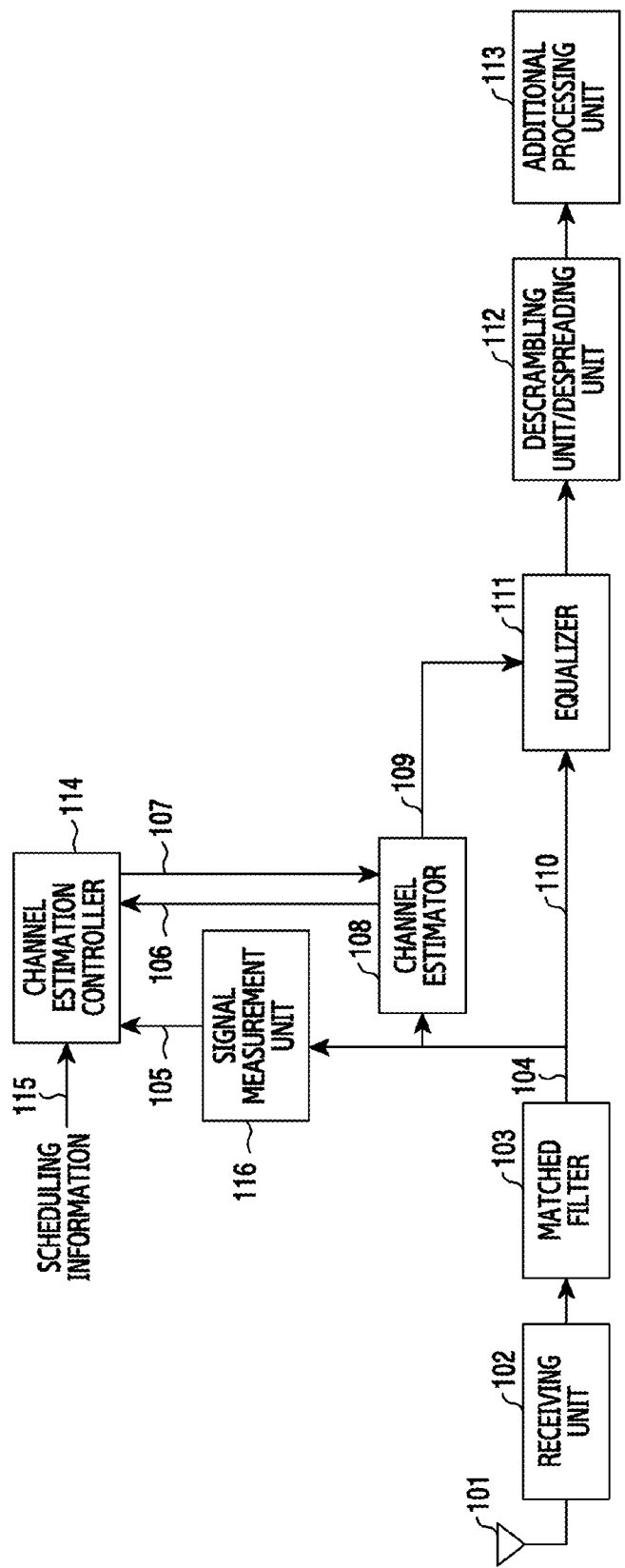
FIG. 1 is a block diagram of a receiver including an adaptive channel estimator in a mobile communication system according to an embodiment of the present disclosure.

FIG. 1 is a block diagram of a receiver including an adaptive channel estimator in a mobile communication system according to an embodiment of the present disclosure.

Referring to FIG. 1, the receiver includes a receiving unit 102, a matched filter 103, a channel estimation controller 114, a signal measurement unit 116, a channel estimator 108, an equalizer 111, a descrambling unit/despreading unit 112, and an additional processing unit 113. Depending on the type of receiver, the matched filter 103 and the descrambling unit/despreading unit 112 may be omitted or replaced by other functional blocks.

The receiving unit 102 receives a Radio Frequency (RF) signal through an antenna 101, converts the RF signal into a baseband signal, and outputs the converted baseband signal to the matched filter 103.

The matched filter 103 performs matched filtering on a signal output from the receiving unit 102. For example, whether a pulse exists may be determined at a time when the magnitude of a signal to noise ratio is maximized. An output of the matched filter 103 is a result of a correlation operation between an input signal and an impulse response, and a digital signal 104 sampled at a multiple of the chip rate is output through the matched filter 103. The digital signal 104 is equalized after passing through the channel estimator 108 and the equalizer 111. The equalized digital signal is subjected to descrambling and despreading 112, and an output signal from the descrambling unit/despreading unit 112 is processed to recover an information signal through additional data processing by the additional processing unit 113.

In an embodiment of the present disclosure, the channel estimation controller 114 adjusts an order of a low-pass filter in the channel estimator 108 on the basis of scheduling information 115 (as indicated by reference numeral "107") and adjusts a coefficient of the low-pass filter in the channel estimator 108 on the basis of a Received Signal Strength Indication (RSSI) 105 from the signal measurement unit 116 and a pilot signal 106 from the channel estimator 108. The pilot signal 106 from the channel estimator 108 is used to calculate an energy or estimate the Doppler spread of a multipath signal.

The signal measurement unit 116 measures the RSSI 105 for a signal output from the matched filter 103 and provides the measurement result to the channel estimation controller 114.

Figure 2:
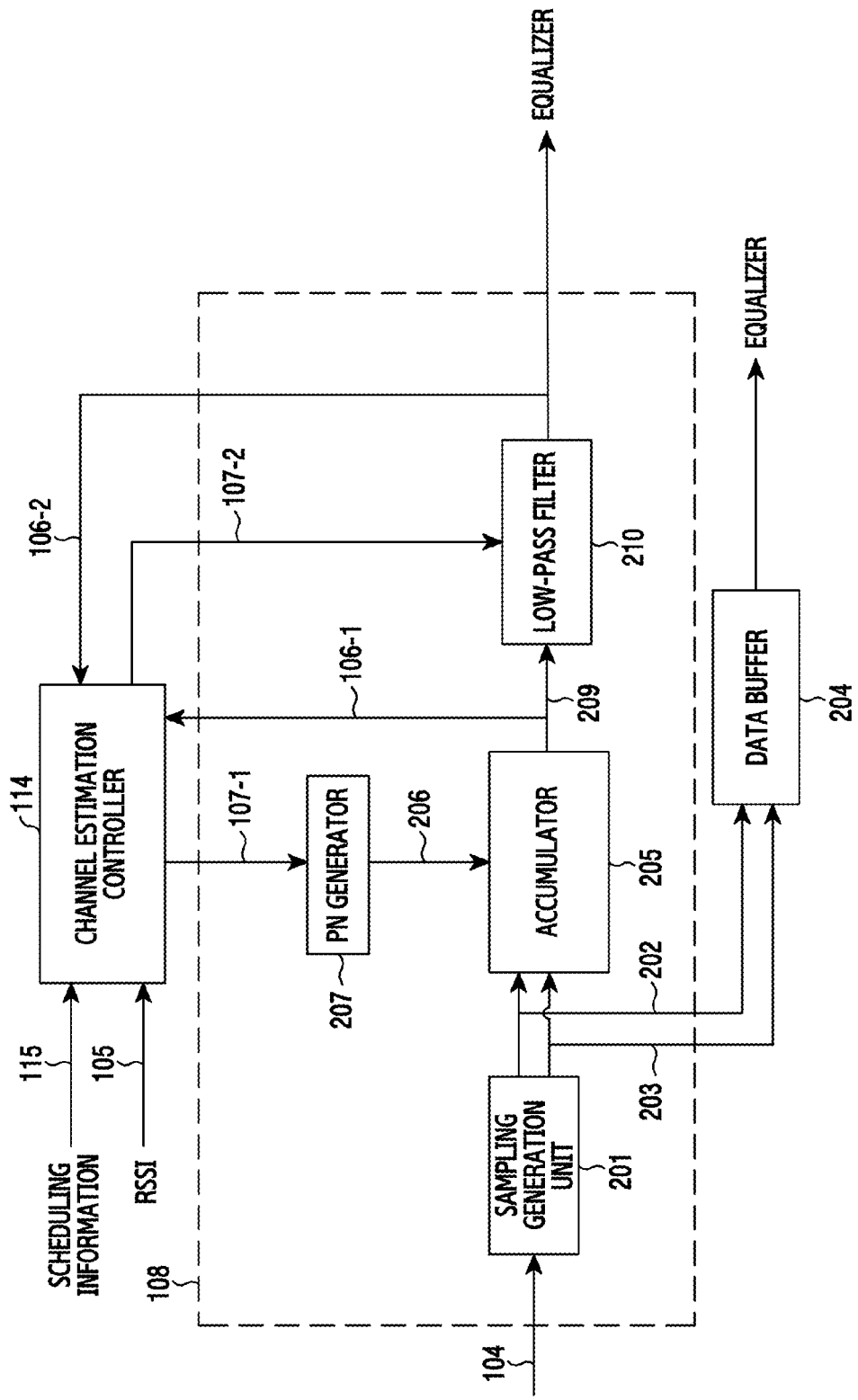
FIG. 2 is a block diagram of an adaptive channel estimator of FIG. 1 according to an embodiment of the present disclosure.

FIG. 2 is a block diagram of the adaptive channel estimator of FIG. 1 according to an embodiment of the present disclosure.

Referring to FIG. 2, the channel estimator 108 includes a sampling generation unit 201, a accumulator 205, a low-pass filter 210, and a Pseudo random Noise (PN) generator 207. The channel estimator 108 is a function block that despreads a signal for which a transmission pattern is already known, such as a pilot signal, and then performs channel estimation using its correlation with the original information signal. For a signal that has undergone a multipath channel, the channel estimator 108 must be able to estimate information on the multipath. In an embodiment of the present disclosure, the channel estimator 108 performs parallel channel estimation on N consecutive taps having a delay time difference of a half-chip interval, and in this case, the channel estimator 108 is assumed to be a multi-tap channel estimator having a channel estimation range of an N/2 chip. The sampling generation unit 201, the accumulator 205, and the PN generator 207 in the channel estimator 108 are function blocks associated with a WCDMA or HSDPA system, but the present disclosure is not limited to the WCDMA or HSDPA system. For example, in the case of an Orthogonal Frequency Division Multiplexing (OFDM) based receiver, the sampling generation unit 201, the accumulator 205, and the PN generator 207 may be replaced by a serial-to-parallel conversion block, a Cyclic Prefix (CP) removal block, a Fast Fourier Transform (FFT) operation unit, and the like.

In an embodiment of the present disclosure, the sampling generation unit 201, the accumulator 205, and the PN generator 207 in the channel estimator 108 are referred to as a pilot detection unit.

In this regard, in an adaptive multi-tap segment channel estimator, the sampling generation unit 201 and the PN generator 207, the accumulator 205, and the data buffer 204 and the equalizer 111 may be operated while being synchronized with a clock, respectively.

The sampling generation unit 201 converts the digital signal 104 from the matched filter 103, which has been sampled at a multiple of a chip rate, into a single-chip rate digital signal and then oversamples the single-chip rate digital signal into an on-sample 202 and a late-sample 203. The digital signal 104 that has passed through the sampling generation unit 201 is transferred to the accumulator 205 and the data buffer 204 at the same time and thus channel estimation and channel equalization processes may be performed in parallel.

The PN generator 207 generates a PN code for performing descrambling and despreading on the basis of a control signal 107-1 received from the channel estimation controller 114 and outputs the generated PN code 206 to the accumulator 205. The PN code 206 may be a Gold sequence (or Gold code) or an orthogonal code for a pilot channel (e.g., Orthogonal Variable Spreading Factor (OVSF) code or a Walsh code). The orthogonal code is used to distinguish between different channels.

The accumulator 205 performs descrambling and despreading by multiplying the sampled signals (i.e., on-sample and late-sample) 202, 203 from the sampling generating unit 201 by the PN code 206 from the PN generator 207. For example, the accumulator 205 recovers the pilot signal by multiplying the sampling signals by the PN code.

The low-pass filter 210 filters out-of-passband noise from a despread pilot signal 209 for channel estimation, output from the accumulator 205, according to its adjusted filter bandwidth and order, and then provides the result of the filtering to the equalizer 111.

The data buffer 204 outputs the oversampled signals 202, 203 to the equalizer 111 after delaying them by a predetermined time.

In an embodiment of the present disclosure, the data buffer 204 may be included in the channel estimator 108 or the equalizer 111. In another embodiment of the present disclosure, the data buffer 204 may be a separate component.

In this regard, the data buffer 204 alternately inputs (i.e., stores) double-chip rate data and outputs data in a First In First Out (FIFO) manner. Further, the data buffer 204 may be used for the purpose of delaying a data signal by the time required to perform channel estimation by the channel estimator 108 and to calculate and output an equalizer tap gain, thereby equalizing the data signal using an effective equalizer tap gain.

The order and bandwidth of the low-pass filter 210 is adjusted through a control signal 107-2 from the channel estimation controller 114.

For example, in order to determine the order and bandwidth of the low-pass filter 210, the channel estimation controller 114 receives scheduling information 115 from a scheduler, receives RSSI measurement information 105 from the signal measurement unit 116, and receives the input and output signals of the low-pass filter 210 from the channel estimator 108.

The channel estimation controller 114 calculates the Signal to Noise Ratio (SNR) of a channel that is estimated using the RSSI estimated on the basis of the channel estimation signal 106 of each tap and the signal 105 before despreading and determines the bandwidth by adjusting the coefficient of the low-pass filter 210 through the calculated SNR (as indicated by reference numeral "107-2"). Further, the channel estimation controller 114 analyzes and tracks the energy of each channel tap so as to adjust the channel tap such that a channel to be estimated is always within its operation window.

Further, the channel estimation controller 114 determines and adjusts the order of the low-pass filter 210 on the basis of scheduling information (as indicated by reference numeral "107-2").

As described above, an embodiment of the present disclosure can adaptively adjust the order and bandwidth of a low-pass filter, thereby efficiently reducing a noise signal, which is input into the low-pass filter along with a received signal. In addition, in order to automatically compensate for group delay occurring when a higher-order low-pass filter is used and adjust the bandwidth (as indicated by reference numeral "107-2"), there is a need to estimate a Doppler spread, an SNR for each tap, and a RSSI to be applied to a terminal. In this case, a signal 209 upstream of the low-pass filter 210 is transmitted to the channel estimation controller 114 so as to estimate the RSSI value before despreading, the SNR value for each tap of the low-pass filter 210, and the Doppler spread.

Figure 3:
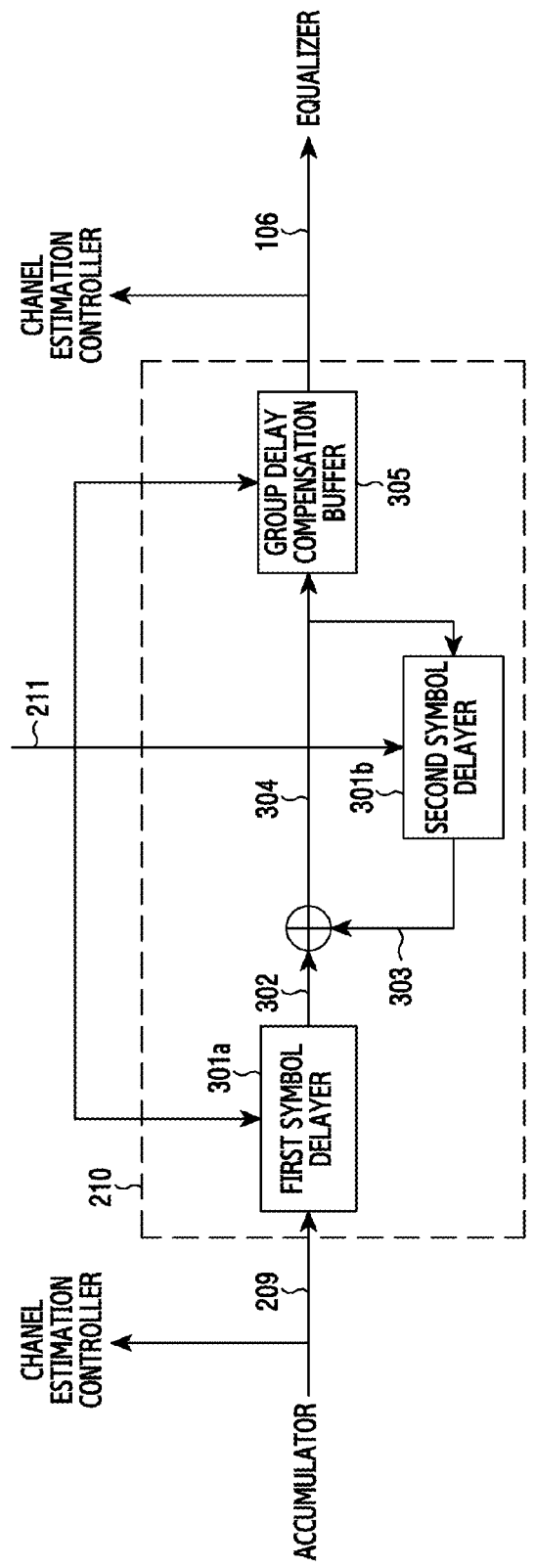
FIG. 3 is a block diagram of a low-pass filter in the adaptive channel estimator of FIG. 2 according to an embodiment of the present disclosure.

FIG. 3 is a block diagram of a low-pass filter 210 in the adaptive channel estimator of FIG. 2 according to an embodiment of the present disclosure.

Referring to FIG. 3, the low-pass filter 210 includes two symbol delayers 301 and a group delay compensation buffer 305. A feedback path may be established between a first symbol delayer 301 and the group delay compensation buffer 305 using a second symbol delayer 301. An output signal 302 from the first symbol delayer 301 and an output signal 303 from the second symbol delayer 301 may be added together, and the added signal 304 may be provided as an input into the group delay compensation buffer 305.

An embodiment of the present disclosure uses the group delay compensation buffer 305 to keep group delay for each filter order constant when adaptively adjusting the order of the low-pass filter 210. Since the low-pass filter 210 depends on the positions of zeros and poles of a transfer function representing the low-pass filter 210, two symbol delayers 301a and 301b are used in the feedforward path 302 and the feedback path 303 of an input value respectively so that the positions of zeros and poles can be adaptively adjusted and the order of the low-pass filter 210 can be adaptively changed. To deliver an effective channel estimation value, the channel estimation controller 114 adaptively compensates for data delayed according to a selected bandwidth by controlling the symbol delayers 301a and 301b, determines the order of the low-pass filter 210, and determines the bandwidth by allocating an appropriate coefficient according to the order of the low-pass filter 210. In this case, the channel estimation controller 114 must estimate the extent of a Doppler spread and an SNR in order to determine a coefficient and filter bandwidth of the low-pass filter 210, and determine the order of the low-pass filter 210 by considering the overall system delay according to a selected bandwidth. A reason why the order of the low-pass filter 210 must be adaptively determined is that, when reception and non-reception of valid data are repeated, the use of a filter having large group delay may result in transition to the non-reception interval before an effective channel value is obtained, and in this case, it may be advantageous to use a lower-order low-pass filter 210 that has small group delay. The channel estimation controller 114 may adjust the bandwidth using the symbol delayers 301a and 301b in the feedforward path 302 and the feedback path 303, and filtered data may be delivered to the equalizer 111 with a certain delay value by passing through the group delay compensation buffer 305. In an embodiment of the present disclosure, the order and bandwidth of a low-pass filter 210 is adaptively adjusted without degrading the performance of a terminal.

Reference will now be made to the relationship between the data buffer 204 of FIG. 2 and the group delay compensation buffer 305 in the low-pass filter 210 of FIG. 3.

In an embodiment of the present disclosure, the size of the data buffer 204 is set to a fixed value with a sufficient margin by considering the maximum group delay that occurs in the low-pass filter 210, and the value of delay that is compensated for through the group delay compensation buffer 305 is adaptively changed according to the order of the low-pass filter 210. For example, the value of delay that is compensated for through the group delay compensation buffer 305 may be inversely proportional to the order of the low-pass filter 210. As an example, if the size of the data buffer 204 is fixed to 10 and the time required until channel estimation is performed by the channel estimator 108 and an equalizer tap gain is calculated and output corresponds to 6, then the size of the group delay compensation buffer 305 is 4 (i.e., 10−6=4). As another example, if the time required until channel estimation is performed by the channel estimator 108 and an equalizer tap gain is calculated and output corresponds to 4, then the size of the group delay compensation buffer 305 is 6 (i.e., 10−4=6).

In an embodiment of the present disclosure, it may be possible to use the data buffer 204, the size of which is changed according to the time required until channel estimation is performed by the channel estimator 108 and an equalizer tap gain is calculated and output, without the group delay compensation buffer 305.

Figure 4:
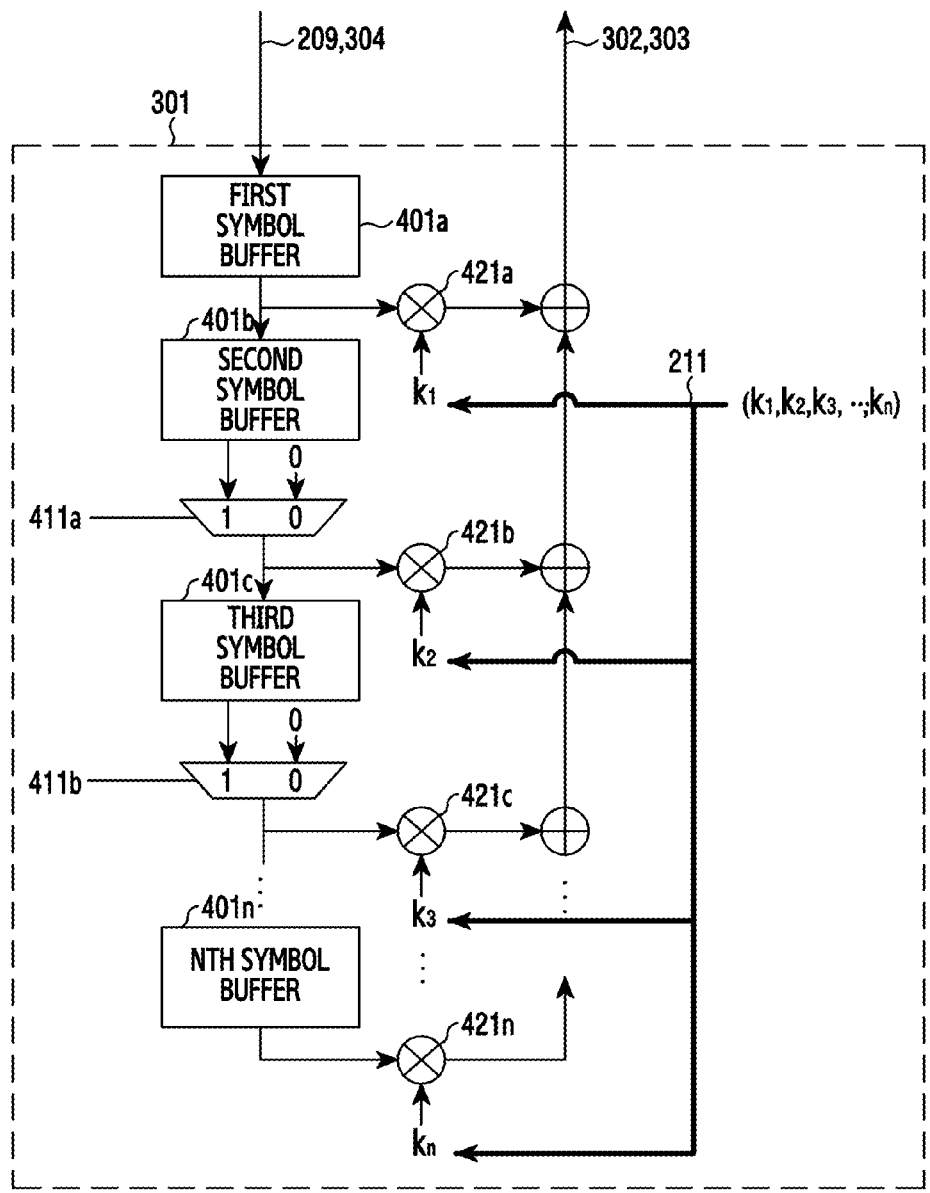
FIG. 4 is a block diagram of a symbol delayer in a low-pass filter of FIG. 3 according to an embodiment of the present disclosure.

FIG. 4 illustrates a symbol delayer 301a, 301b in the low-pass filter 210 of FIG. 3 according to an embodiment of the present disclosure.

Referring to FIG. 4, the symbol delayer 301a, 301b includes a plurality of symbol buffers 401a, 401b, . . . , 401n for delaying the delivery of symbol data for a unit time, a plurality of multiplexers 411a, 411b for selecting the order of the low-pass filter 210, and a plurality of multipliers 421a, 421b, . . . , 421n for multiplying filter coefficients.

For example, the symbol buffers 401a, 401b, . . . , 401n are arranged in series, and the multiplexers 411a, 411b, . . . , 411n−1 are connected between the respective symbol buffers 401b, 401c, . . . , 401n except the first and second symbol buffers 401a, 401b. The first input of each multiplexer 411a, 411b, . . . , 411n−1 is connected to the output of the previous multiplexer 411b, 411c, . . . , 411n−1, and the second input of the multiplexer 411a, 411b, . . . , 411n−1 is connected to the "0" input end. One of the first input and the second input of the multiplexer is selected according to a control signal 107-2 of the channel estimation controller 114.

The channel estimation controller 114 determines filter coefficients ($k_1, k_2, \ldots, k_n$) according to a bandwidth required by data, and the multiplexers 411a, 411b, . . . , 411n−1 are operated to adjust the order of the low-pass filter 210 under the control of the channel estimation controller 114. For example, the low-pass filter 210 has an order of 2 when the second input values of all the multiplexers 411a, 411b, . . . , 411n−1 are set to "0," the low-pass filter 210 has an order of 2 when the second input value of the first multiplexer 411a is set to "1" and the input values of the other multiplexers 411b, 411c, . . . , 411n−1 are set to "0," and the low-pass filter 210 has an order of n when the second input values of all the multiplexers 411 are set to "1."

For example, when a short interval for which data is received and a subsequent interval for which data is not received are repeated, data is processed fast by shortening group delay (e.g. by setting the filter order to a lower value). In contrast, when a long interval for which data is received and a subsequent interval for which data is not received are repeated, the frequency range of the passband is precisely narrowed by setting the filter order to a higher value. This is determined on the basis of data scheduling information.

Since the bandwidth is adjusted by a combination of filter coefficients ($k_1, k_2, \ldots, k_n$), the channel estimation controller 114 determines the bandwidth on the basis of the energy, the RSSI measurement value, and the Doppler spread of the signal and provides filter coefficients corresponding to the determined bandwidth.

Figure 5:
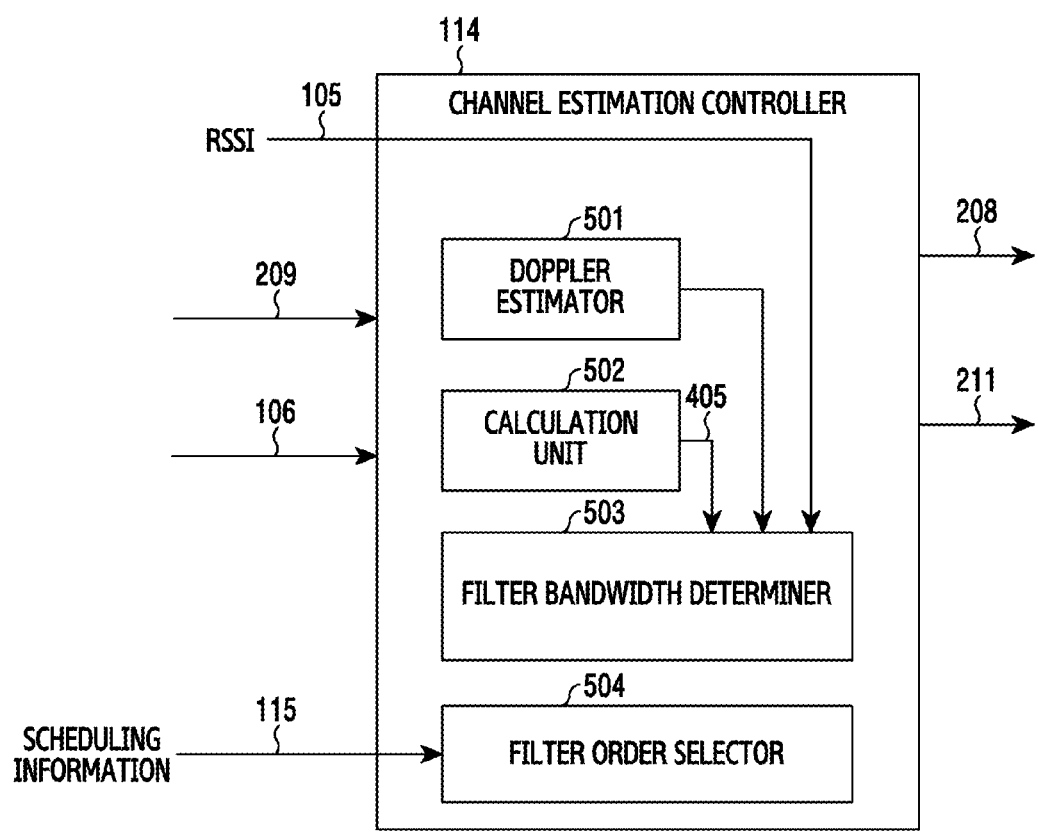
FIG. 5 is a block diagram of a channel estimation controller in an adaptive channel estimator of FIG. 2 according to an embodiment of the present disclosure.

FIG. 5 illustrates a channel estimation controller 114 in the adaptive channel estimator of FIG. 2 according to an embodiment of the present disclosure.

The channel estimation controller 114 includes a Doppler estimator 501, a calculation unit 502, a filter bandwidth determiner 503, and a filter order selector 504. In an embodiment of the present disclosure, the channel estimation controller 114 requires four pieces of information to control the channel estimator 108 and uses the information to set the bandwidth of the channel estimator 108 and to determine the order of the low-pass filter 210.

The channel estimation controller 114 have four input signals 105, 106-1, 115, 106-2 and two output signals 107-1, 107-2. The input signal 105 comprises RSSI measurement value, the input signal 106-2 comprises the pilot signal after low-pass filtering, the input signal 106-1 comprises the pilot signal before low-pass filtering, and the input signal 115 comprises scheduling information. The output signal 107-1 comprises a first control signal for generating a PN code, and the output signal 107-2 comprises a second control signal for controlling a filter order and a bandwidth of filter.

The Doppler estimator 501 estimates an extent of a Doppler spread using the pilot signal 106-1 before the low-pass filtering, received from the channel estimator 108. The calculation unit 502 estimates the energy for each tap in the channel estimation window using the pilot signal 106-2 after low-pass filtering. The filter bandwidth determiner 503 determines the bandwidth of the estimated channel on the basis of the RSSI measurement value 105 received externally, the Doppler spread information (or Doppler frequency) received from the Doppler estimator 501, and the energy information 405 for each tap in the channel estimation window, received from the calculation unit 502. In addition, the filter order selector 504 determines the filter order on the basis of the scheduling information 115.

The channel estimation controller 114 transfers the bandwidth of the low-pass filter 210 and determines the order of the low-pass filter 210 by transmitting, to the symbol delayer 301a, 301b, a control signal 211 according to the filter coefficients (or bandwidth) and the order determined by the filter bandwidth determiner 503 and the filter order selector 504. For example, when the scheduling of transmission data changes significantly as in a compressed mode that occurs in order to measure parameters for handover before inter-frequency handover, and thus an effective channel estimation result must be transferred within a short interval, the channel estimation controller 114 controls the low-pass filter 210 to use a lower order. In contrast, when scheduling is stable and in order to obtain a high-performance equalizer gain, the channel estimation controller 114 controls the low-pass filter 210 to use a higher order.

Figure 6A:
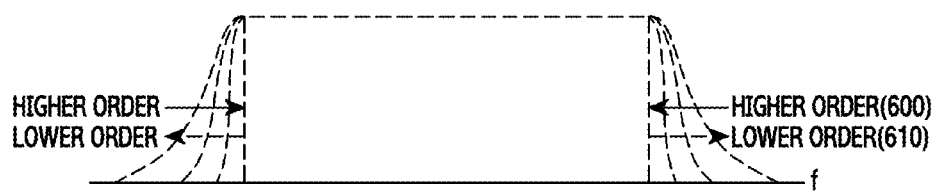
FIG. 6A illustrates a filter order-dependent bandwidth variation according to an embodiment of the present disclosure.

FIG. 6A illustrates a low-pass filter order-dependent bandwidth variation according to an embodiment of the present disclosure.

Referring to FIG. 6A, a low-pass filter 210 order-dependent bandwidth variation is shown. For example, the lower the filter order, the more gentle the slope of the transfer function of the low-pass filter 210 (as indicated by reference numeral "610"), and thus the transition width interval is lengthened. In contrast, the higher the filter order, the sharper the slope of the transfer function of the low-pass filter 210 (as indicated by reference numeral "600"), and thus the transition width interval is shortened as compared to a lower-order low-pass filter 210.

Figure 6B:
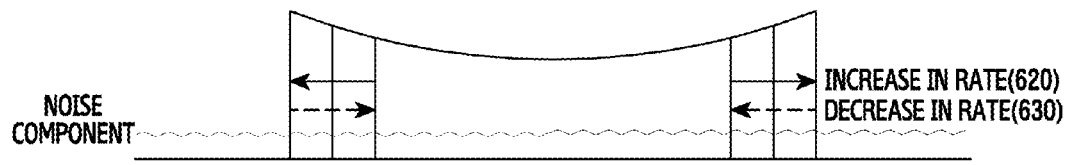
FIG. 6B illustrates a Doppler spread or rate-dependent bandwidth variation according to an embodiment of the present disclosure.

FIG. 6B illustrates a Doppler spread or rate-dependent bandwidth variation according to an embodiment of the present disclosure.

Referring to FIG. 6B, a Doppler spread (or rate)-dependent bandwidth variation is shown. For example, the larger the Doppler spread (or the higher the rate), the wider the bandwidth of the low-pass filter 210 that can be used to minimize the Mean Square Error (MSE) (as indicated by reference numeral "620"). In contrast, the smaller the Doppler spread (or the lower the rate), the narrower the bandwidth of the low-pass filter 210 that can be used to minimize the MSE (as indicated by reference numeral "630"). Accordingly, a bandwidth that minimizes the MSE is determined on the basis of the Doppler spread, and filter coefficients are determined corresponding to the determined bandwidth.

Referring to FIG. 6A and FIG. 6B, out-of-passband noise components may be eliminated through the low-pass filter 210.

Figure 7:
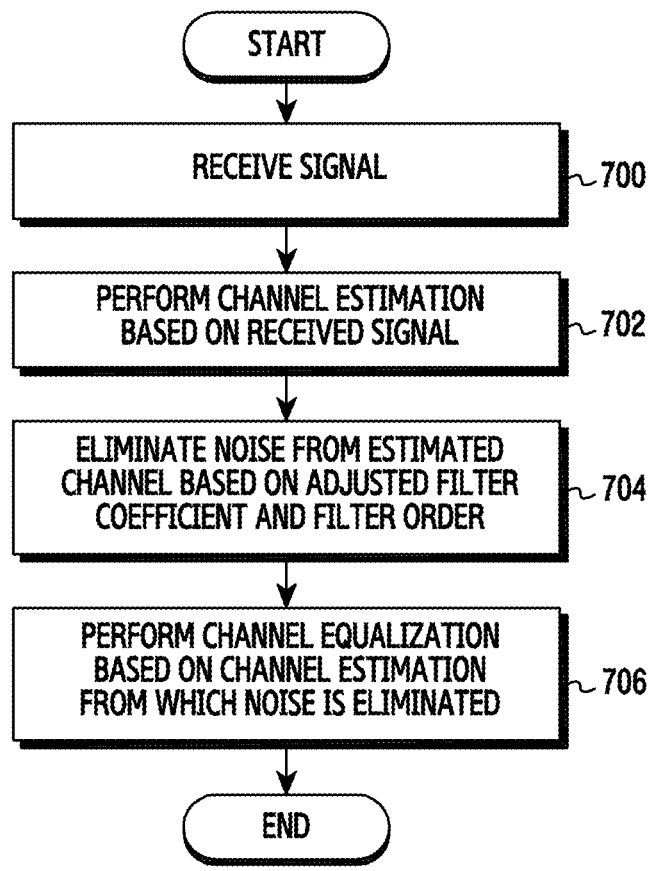
FIG. 7 is a flowchart of a method of a receiver in a mobile communication system according to an embodiment of the present disclosure.

FIG. 7 is a flowchart of a method of a receiver in a mobile communication system according to an embodiment of the present disclosure.

Referring to FIG. 7, a receiver receives a pilot signal in step 700 and performs channel estimation on the basis of the received pilot signal in step 702. For example, the receiver recovers the pilot signal by multiplying sampling signals by a PN code and performs channel estimation on the basis of the recovered pilot signal.

In step 704, the receiver eliminates out-of-passband noise from the recovered pilot signal by passing the pilot signal through a low-pass filter based on the adjusted filter order and bandwidth (or filter coefficients).

The filter order is determined on the basis of data scheduling information. For example, when a base station transmits data on the basis of a compressed mode, inter-frequency neighbor cell measurements are performed in the transmission gap of a downlink transmission interval. The gap distance, gap length, or the like may be determined by a Transmission Gap Pattern Sequence (TGPS) that is specified by the base station, and there may be a case where the distance between gaps is determined to be as short as a predetermined slot interval. In this case, if a higher-order low-pass filter 210 is used, then the group delay through the low-pass filter 210 increases, and thus when the low-pass filter 210 converges slowly, channel estimation may be meaningless because the receiver enters a non-reception interval again before an output value of the channel estimator is used. Accordingly, when a compressed mode is started, there may be a need to reduce group delay by adjusting the order of the low-pass filter 210 to a lower value.

The filter bandwidth or filter coefficients may be determined by at least one of the Doppler spread and the SNR. For example, the larger the Doppler spread, the wider the bandwidth of the low-pass filter 210 in which the MSE is lowered, and the smaller the Doppler spread, the narrower the bandwidth of the low-pass filter 210 in which the MSE is lowered. Accordingly, it may be preferable to set the low-pass filter 210 to a wider bandwidth as the Doppler spread increases and to set the low-pass filter 210 to a narrower bandwidth as the Doppler spread decreases. Further, when the filter bandwidth or filter coefficients are adaptively selected by considering the SNR in addition to the Doppler spread, noise included in the signal can be efficiently eliminated. For example, the higher the SNR, the wider the bandwidth of the low-pass filter 210 in which the MSE is lowered, and the lower the SNR, the narrower the bandwidth of the low-pass filter 210 in which the MSE is lowered. Accordingly, it may be preferable to set the low-pass filter 210 to a wider bandwidth as the SNR increases and to set the low-pass filter 210 to a narrower bandwidth as the SNR decreases.

In step 706, the receiver performs channel equalization on the basis of the pilot signal from which out-of-passband noise is eliminated.

Figure 8:
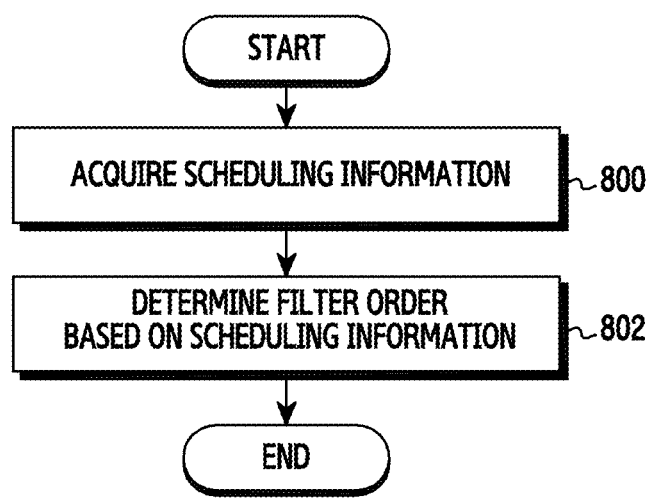
FIG. 8 is a flowchart of a method of determining an order of a low-pass filter in an adaptive channel estimator according to an embodiment of the present disclosure.

FIG. 8 is a flowchart of a method of determining an order of a low-pass filter 210 in an adaptive channel estimator according to an embodiment of the present disclosure.

Referring to FIG. 8, the channel estimation controller 114 acquires scheduling information externally in step 800 and determines the order of the low-pass filter 210 on the basis of the scheduling information in step 802. For example, when a short data transmission interval is repeated, the channel estimation controller 114 controls channel estimation to rapidly pass through and output from the filtering by adjusting the filter order to a lower value, and when a data transmission interval is long and thus there is plenty of time until the next data transmission interval, the channel estimation controller 114 controls channel estimation to slowly pass through and output from the filtering by adjusting the filter order to a higher value.

Figure 9:
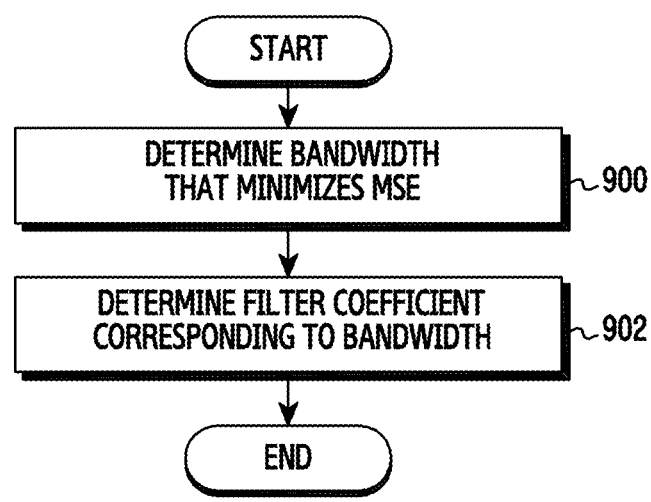
FIG. 9 is a flowchart of a method of determining a coefficient of a low-pass filter in an adaptive channel estimator according to an embodiment of the present disclosure.

FIG. 9 is a flowchart of a method of determining a coefficient of a low-pass filter 210 in an adaptive channel estimator according to an embodiment of the present disclosure.

In step 900, the channel estimation controller 114 determines a bandwidth on the basis of a Mean Square Error (MSE) including the Doppler spread and the SNR.

In step 902, the channel estimation controller 114 determines a filter coefficient corresponding to the determined bandwidth. The filter coefficient may be predetermined corresponding to the bandwidth.

Figure 10:
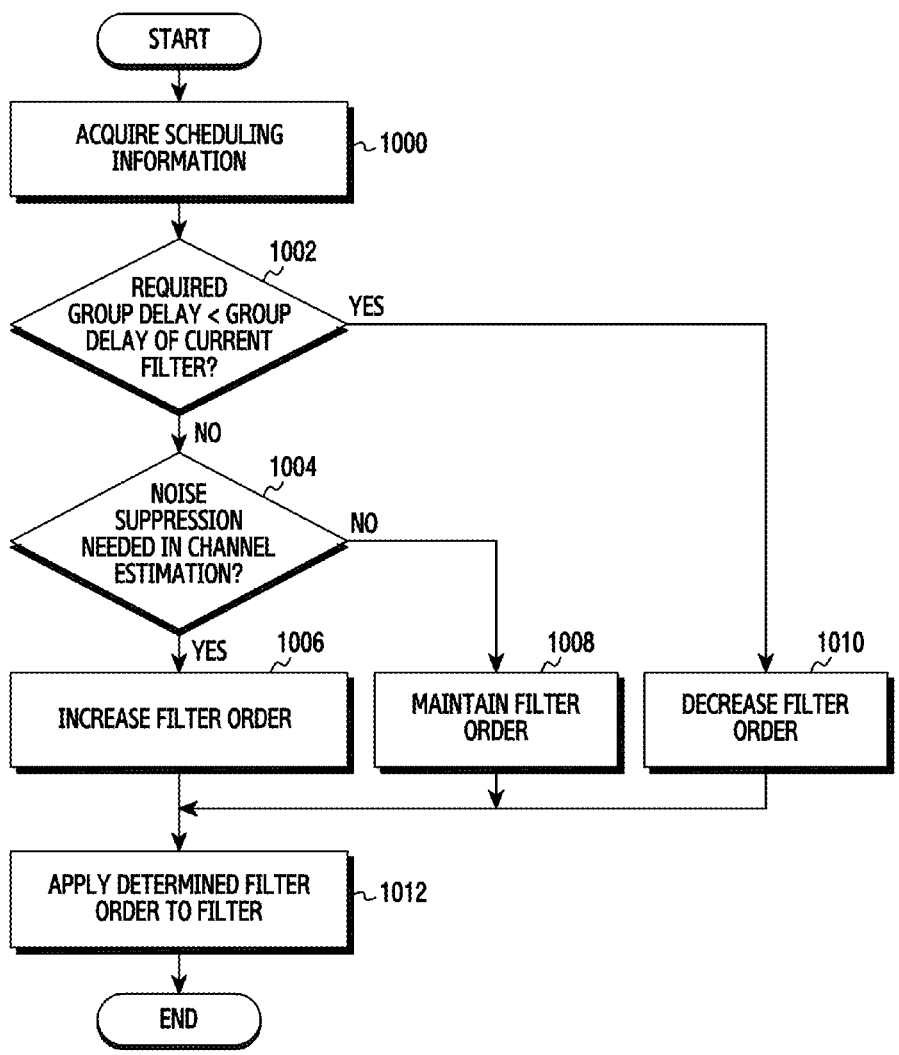
FIG. 10 is a flowchart of a method of determining an order of a low-pass filter in an adaptive channel estimator according to an embodiment of the present disclosure.

FIG. 10 is a flowchart of a method of determining an order of a low-pass filter in an adaptive channel estimator according to an embodiment of the present disclosure.

Referring to FIG. 10, the channel estimation controller 114 acquires scheduling information in step 1000 and determines in step 1002 whether required group delay is less than a group delay of a current low-pass filter 210 on the basis of scheduling information. For example, the required group delay may be determined on the basis of data scheduling information, and the group delay of the current low-pass filter 210 may be a group delay corresponding to the filter order currently set for the low-pass filter 210.

When the required group delay is less than the group delay of the current low-pass filter in step 1002, the channel estimation controller 114 decreases the filter order in step 1010.

In contrast, when the required group delay is greater than the group delay of the current low-pass filter 210 in step 1002, the channel estimation controller 114 determines in step 1004 whether it is necessary to suppress noise in channel estimation. When it is not necessary to suppress noise in channel estimation, the channel estimation controller 114 maintains the current filter order in step 1008, and when it is necessary to suppress noise in channel estimation, the channel estimation controller 114 increases the filter order in step 1006.

In step 1012, the channel estimation controller 114 may adjust the order of the low-pass filter 210 in the channel estimator 108 on the basis of the increased/decreased or maintained filter order.

Figure 11:
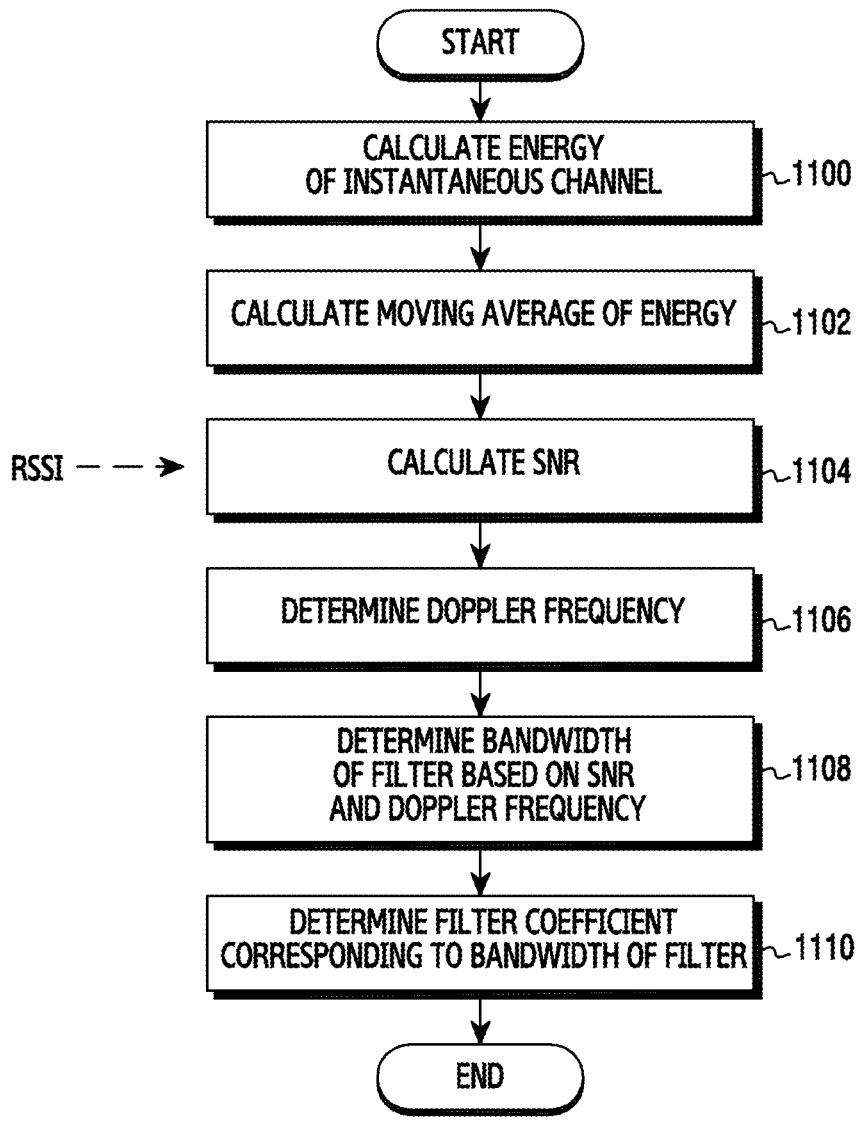
FIG. 11 is a flowchart of a method of determining a coefficient of a low-pass filter in an adaptive channel estimator according to an embodiment of the present disclosure.

FIG. 11 is a flowchart of a method of determining a coefficient of a low-pass filter 210 in an adaptive channel estimator according to an embodiment of the present disclosure.

Referring to FIG. 11, the channel estimation controller 114 calculates an energy of an instantaneous channel in step 1100 and calculates a moving average of the channel energy in step 1102. In this case, the channel energy is tracked on the basis of the pilot signal after the low-pass filtering such that the channel to be estimated is within the operation window.

In step 1104, the channel estimation controller 114 determines the SNR on the basis of a RSSI measurement within the operation window.

In step 1106, the channel estimation controller 114 determines a Doppler spread or Doppler frequency on the basis of the pilot signal before the low-pass filtering.

In step 1108, the channel estimation controller 114 selects the bandwidth of the low-pass filter such that the MSE is minimized.

In step 1110, the channel estimation controller 114 determines a filter coefficient corresponding to the determined bandwidth using a lookup table.

The coefficient of the low-pass filter 210 is a constant that determines the bandwidth (or coefficients) of the low-pass filter 210, and since the bandwidth required by a signal is different according to the Doppler spread and the SNR, it is preferable to use a different low-pass filter coefficient for each signal. Since the low-pass filtering is intended to pass a valid signal therethrough and eliminate only noise components, there is a need for the metric on which it is determined whether the signal after the low-pass filtering is analogous to the valid signal component without any noise component. In an embodiment of the present disclosure, the MSE between the signal obtained after the low-pass filtering of a received signal (e.g., y[n]=h[n]+v[n], where h[n] is a signal component, and v[n] is a noise component) and the original signal (e.g. h[n]) to be estimated is sought, the filter coefficient that minimizes the MSE is obtained, and the obtained coefficient is stored in a lookup table. The channel estimation controller 114 estimates the Doppler spread and the SNR, and then reads out the low-pass filter coefficient corresponding to each estimate from the lookup table in the channel estimation controller 114 and applies the read filter coefficient to the low-pass filter 210. If the impulse response of a low-pass filter 210 is expressed by g[n], then the MSE is defined by Equation (1) as follows:

$$MSE = E\left[\left|\sum_{l=-\infty}^{\infty} g[l]h[n-l] + \sum_{l=-\infty}^{\infty} g[l]v[n-l] - h[n-\Delta]\right|^2\right] \quad (1)$$

$$= \sigma_h^2 \left( \sum_{k=-\infty}^{\infty}\sum_{l=-\infty}^{\infty} g[k]g[l]J_0(2\pi f_d(k-l)T_s) + J_0(0) + \frac{\sigma_v^2}{\sigma_h^2}\sum_{k=-\infty}^{\infty} g^2[k] - 2\sum_{k=-\infty}^{\infty} g[k]J_0(2\pi f_d(k-\Delta)T_s)\right)$$

In Equation (1), $\Delta$ denotes a group delay caused by the low-pass filter, $T_s$ denotes the distance between input samples, $\sigma_h^2$ and $\sigma_v^2$ denote the variances of channel energy and noise, $$\frac{\sigma_v^2}{\sigma_h^2}$$

denotes the reciprocal number of the SNR, $f_d$ denotes the Doppler spread (or Doppler frequency), $J_0$ denotes the 0th order Bessel function of the first kind, g[n] denotes the low-pass filter, h[n] denotes the signal component, and v[n] denotes the noise component.

Figure 12:
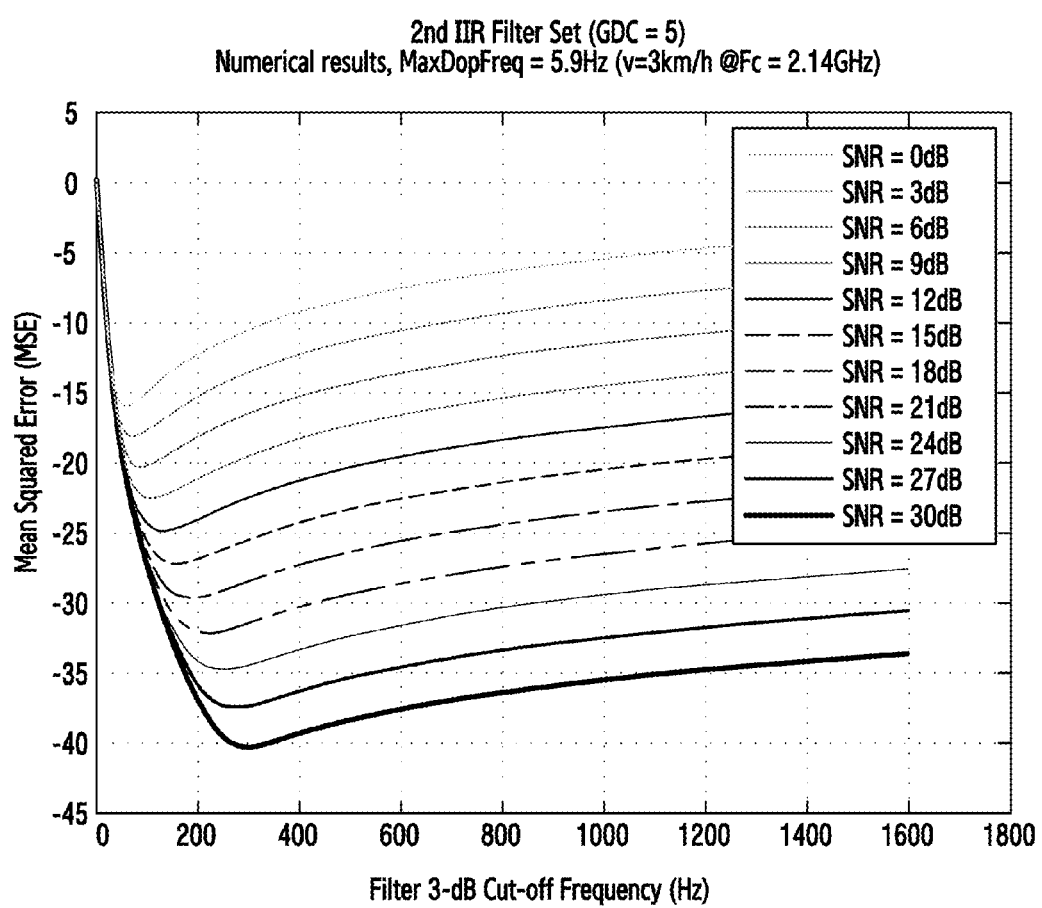
FIGS. 12 and 13 are graphs that each illustrate a mean square error according to a Doppler frequency when a maximum group delay is limited to 5 in a second-order low-pass filter according to an embodiment of the present disclosure.

FIG. 12 is a graph illustrating a mean square error according to a Doppler frequency when a maximum group delay is limited to 5 in a second-order low-pass filter according to an embodiment of the present disclosure.

FIG. 12 represents the mean square error with every 3 dB increase in the SNR when a second-order low-pass filter that compensates for a group delay of 5 symbols is used and $f_d$=5.9 (v=3 km/h [at $f_c$=2.14 GHz]).

Referring to FIG. 12, the dotted lines indicate the minimum mean error in the corresponding bandwidth that is theoretically calculated, and the solid lines indicate the mean error when group delay is set to 5 in consideration of the system design. As the coefficient of the low-pass filter, the coefficient corresponding to the bandwidth that minimizes the mean square error of the low-pass filter is used.

For example, the bandwidth that minimizes the MSE is about 70 Hz when the SNR=0 dB, the bandwidth that minimizes the MSE is about 90 Hz when the SNR=3 dB, the bandwidth that minimizes the MSE is about 95 Hz when the SNR=6 dB, the bandwidth that minimizes the MSE is about 105 Hz when the SNR=9 dB, the bandwidth that minimizes the MSE is about 125 Hz when the SNR=12 dB, the bandwidth that minimizes the MSE is about 150 Hz when the SNR=15 dB, the bandwidth that minimizes the MSE is about 195 Hz when the SNR=18 dB, the bandwidth that minimizes the MSE is about 200 Hz when the SNR=21 dB, the bandwidth that minimizes the MSE is about 220 Hz when the SNR=24 dB, the bandwidth that minimizes the MSE is about 250 Hz when the SNR=27 dB, and the bandwidth that minimizes the MSE is about 300 Hz when the SNR=30 dB.

Figure 13:
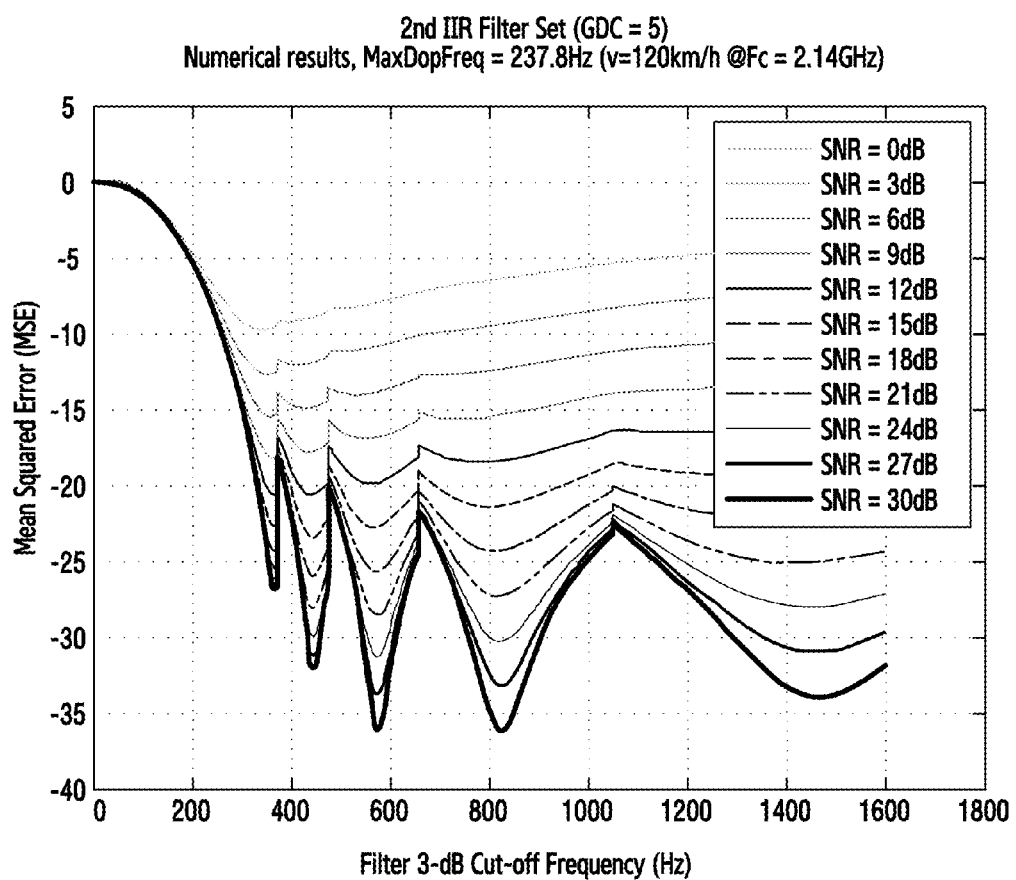

FIG. 13 is a graph illustrating a mean square error according to the Doppler frequency when the maximum group delay is limited to 5 in a second-order low-pass filter according to various embodiments of the present disclosure.

FIG. 13 represents the mean square error with every 3 dB increase in the SNR when a second-order low-pass filter that compensates for a group delay of 5 symbols is used and $f_d$=237.8 (v=120 km/h [at $f_c$=2.14 GHz]).

referring to FIG. 13, the dotted lines indicate the minimum mean error in the corresponding bandwidth that is theoretically calculated, and the solid lines indicate the mean error when group delay is set to 5 in consideration of the system design. As the coefficient of the low-pass filter, the coefficient corresponding to the bandwidth that minimizes the mean square error of the low-pass filter is used.

In an embodiment of the present disclosure, for a low-pass filter with the fixed filter order, the bandwidth of the low-pass filter is determined by estimating an SNR and a Doppler spread and adaptively selecting the coefficient of the low-pass filter according to the estimated SNR and Doppler spread. Further, the order of the low-pass filter is fixed by considering system requirements before the channel estimator 108 is activated and is adaptively selected while changing the coefficient of the low-pass filter.

In an embodiment of the present disclosure, a chip set is configured to detect a pilot signal from a received signal, adaptively adjust a coefficient and an order of a low-pass filter, wherein the coefficient of the low-pass filter is controlled according to characteristics of the pilot signal, and the order of the low-pass filter is controlled according to transmission characteristics of data of the received signal, filter noise from the pilot signal using the low-pass filter and perform channel equalization for the data of the received signal, based on the filtered pilot signal.

In an embodiment of the present disclosure, the order of the low-pass filter is determined based on scheduling information of the data of the received signal, received from a transmitter.

In an embodiment of the present disclosure, the coefficient of the low-pass filter is determined based on a mean square error associated with at least one of a signal to noise ratio and a Doppler frequency of the pilot signal.

In an embodiment of the present disclosure, the mean square error is defined as follows:

$$MSE = E\left[\left|\sum_{l=-\infty}^{\infty} g[l]h[n-l] + \sum_{l=-\infty}^{\infty} g[l]v[n-l] - h[n-\Delta]\right|^2\right]$$

$$= \sigma_h^2 \left( \sum_{k=-\infty}^{\infty}\sum_{l=-\infty}^{\infty} g[k]g[l]J_0(2\pi f_d(k-l)T_s) + J_0(0) + \frac{\sigma_y^2}{\sigma_h^2}\sum_{k=-\infty}^{\infty} g^2[k] - 2\sum_{k=-\infty}^{\infty} g[k]J_0(2\pi f_d(k-\Delta)T_s) \right)$$

where, $\Delta$ denotes group delay caused by the low-pass filter, $T_s$ denotes a distance between input samples, $\sigma_h^2$ and $\sigma_v^2$ denote variances of channel energy and noise, $$\frac{\sigma_v^2}{\sigma_h^2}$$

denotes a reciprocal number of the signal to noise ratio, $f_d$ denotes the Doppler frequency, $J_0$ denotes a 0th order Bessel function of a first kind, $g[n]$ denotes the low-pass filter, $h[n]$ denotes a signal component, and $v[n]$ denotes a noise component.

In an embodiment of the present disclosure, the chip set is further configured to buffer the pilot signal so as to compensate for group delay caused by the adjusted order of the low-pass filter.

In an embodiment of the present disclosure, the chip set is further configured to increase a value of group delay that is compensated for through the group delay compensation buffer when the low-pass filter has a lower order and decreasing the value of group delay that is compensated for through the group delay compensation buffer when the low-pass filter has a higher order.

In an embodiment of the present disclosure, the chip set is further configured to buffer the data.

In an embodiment of the present disclosure, the chip set is further configured to adaptively adjust the coefficient and the order of the low-pass filter by estimating a Doppler frequency, based on the pilot signal before filtering, measuring a signal to noise ratio, based on the filtered pilot signal, determining the coefficient of the low-pass filter, based on the Doppler frequency and the signal to noise ratio and determining the order of the low-pass filter using scheduling information.

As described above, channel estimation performance can be improved by performing channel estimation using an adaptive low-pass filter, where the order of the low-pass filter is adjustable in a range from $1^{st}$ to nth orders.

Further, a signal can be received adaptively to channel variation without a loss in receiver performance by adjusting the filter bandwidth and the filter order while continuously monitoring the Doppler spread, the SNR, and the scheduling information of the transmission data.

While the present disclosure has been described in detail in conjunction with certain embodiments, it will be apparent to those skilled in the art that various modifications and changes may be made therein without departing from the scope and spirit of the present disclosure. Therefore, the scope of the present disclosure should not be defined as being limited to the embodiments disclosed herein, but should be defined by the appended claims and their equivalents.

What is claimed is:

1. A terminal including a transmitter and a receiver, the receiver comprising:
    a pilot detection unit configured to detect a pilot signal from a received signal;
    a low-pass filter configured to filter noise from the pilot signal;
    a channel equalizer configured to perform channel equalization for data of the received signal, based on the filtered pilot signal; and
    a channel estimation controller configured to adaptively adjust at least one of a coefficient and an order of the low-pass filter,
    wherein the coefficient of the low-pass filter is controlled according to characteristics of the pilot signal, and
    wherein the order of the low-pass filter is controlled based on a group delay of a current low-pass filter being used according to a selected bandwidth,
    wherein the coefficient of the low-pass filter is determined based on a mean square error associated with at least one of a signal to noise ratio and a Doppler frequency of the pilot signal, and
    wherein the mean square error is defined as follows:

$$MSE = E\left[\left|\sum_{l=-\infty}^{\infty} g[l]h[n-l] + \sum_{l=-\infty}^{\infty} g[l]v[n-l] - h[n-\Delta]\right|^2\right]$$

$$= \sigma_h^2 \left( \sum_{k=-\infty}^{\infty}\sum_{l=-\infty}^{\infty} g[k]g[l]J_0(2\pi f_d(k-l)T_s) + J_0(0) + \frac{\sigma_y^2}{\sigma_h^2}\sum_{k=-\infty}^{\infty} g^2[k] - 2\sum_{k=-\infty}^{\infty} g[k]J_0(2\pi f_d(k-\Delta)T_s) \right)$$

where, $\Delta$ denotes the group delay of the low-pass filter, $T_s$ denotes a distance between input samples, $\sigma_h^2$ and $\sigma_v^2$ denote variances of channel energy and noise, $$\frac{\sigma_v^2}{\sigma_h^2}$$

denotes a reciprocal number of the signal to noise ratio, $f_d$ denotes the Doppler frequency, $J_0$ denotes a 0th order Bessel function of a first kind, $g[n]$ denotes the low-pass filter, $h[n]$ denotes a signal component, and $v[n]$ denotes a noise component.

2. The terminal of claim 1, wherein the order of the low-pass filter is determined based on scheduling information of the data of the received signal, received from a transmitter.

3. The terminal of claim 2, wherein the scheduling information of the data includes a gap distance between first data included in the data and second data adjacent to the first data.

4. The terminal of claim 1, wherein the low-pass filter comprises:

a first symbol delayer configured to feed forward a first
   signal;
a second symbol delayer configured to feedback a second
   signal;
an adding unit configured to generate the second signal
   using output signals of the first symbol delayer and the
   second symbol delayer; and
a group delay compensation buffer configured to buffer
   the second signal so as to compensate for group delay
   caused by the order of the low-pass filter.

5. The terminal of claim 4, wherein each of the first symbol delayer and the second symbol delayer comprises:
   a plurality of symbol buffers configured to delay transfer of symbol data;
   a plurality of multiplexers configured to select the order of the low-pass filter; and
   a plurality of multipliers configured to multiply the coefficient of the low-pass filter.

6. The terminal of claim 5, wherein the plurality of symbol buffers are arranged in series, each of the plurality of multiplexers is connected between the respective symbol buffers except a first and a second of the plurality of symbol buffers, and an output value of each of the plurality of symbol buffers is multiplied by the filter coefficient.

7. The terminal of claim 4, wherein the group delay compensation buffer is further configured to increase a value of group delay when the low-pass filter has a lower order and decrease the value of group delay when the low-pass filter has a higher order.

8. The terminal of claim 1, further comprising a data buffer configured to buffer the data.

9. The terminal of claim 1, wherein the channel estimation controller comprises:
   a Doppler estimator configured to estimate a Doppler frequency, based on the pilot signal before filtering;
   a calculation unit configured to measure a signal to noise ratio, based on the filtered pilot signal;
   a bandwidth adjuster configured to determine the coefficient of the low-pass filter, based on the Doppler frequency and the signal to noise ratio; and
   a filter order selector configured to determine the order of the low-pass filter using scheduling information.

10. A reception method, comprising:
   detecting a pilot signal from a received signal;
   adaptively adjusting a coefficient and an order of a low-pass filter, wherein the coefficient of the low-pass filter is controlled according to characteristics of the pilot signal, and the order of the low-pass filter is controlled based on a group delay of a current low-pass filter being used according to a selected bandwidth;
   filtering noise from the pilot signal using the low-pass filter; and
   performing channel equalization for the data of the received signal, based on the filtered pilot signal,
   wherein the coefficient of the low-pass filter is determined based on a mean square error associated with at least one of a signal to noise ratio and a Doppler frequency of the pilot signal, and
   wherein the mean square error is defined as follows:

$$MSE = E\left[\left|\sum_{l=-\infty}^{\infty} g[l]h[n-l] + \sum_{l=-\infty}^{\infty} g[l]v[n-l] - h[n-\Delta]\right|^2\right]$$

-continued $$= \sigma_h^2 \left( \sum_{k=-\infty}^{\infty} \sum_{l=-\infty}^{\infty} g[k]g[l]J_0(2\pi f_d(k-l)T_s) + J_0(0) + \frac{\sigma_v^2}{\sigma_h^2} \sum_{k=-\infty}^{\infty} g^2[k] - 2\sum_{k=-\infty}^{\infty} g[k]J_0(2\pi f_d(k-\Delta)T_s) \right)$$

where, $\Delta$ denotes the group delay of the low-pass filter, $T_s$ denotes a distance between input samples, $\sigma_h^2$ and $\sigma_v^2$ denote variances of channel energy and noise, $$\frac{\sigma_v^2}{\sigma_h^2}$$

denotes a reciprocal number of the signal to noise ratio, $f_d$ denotes the Doppler frequency, $J_0$ denotes a 0th order Bessel function of a first kind, $g[n]$ denotes the low-pass filter, $h[n]$ denotes a signal component, and $v[n]$ denotes a noise component.

11. The reception method of claim 10, wherein the order of the low-pass filter is determined based on scheduling information of the data of the received signal, received from a transmitter.

12. The reception method of claim 10, further comprising buffering the pilot signal so as to compensate for group delay caused by the adjusted order of the low-pass filter.

13. The reception method of claim 12, further comprising increasing a value of group delay that is compensated for through the group delay compensation buffer when the low-pass filter has a lower order and decreasing the value of group delay that is compensated for through the group delay compensation buffer when the low-pass filter has a higher order.

14. The reception method of claim 10, further comprising buffering the data.

15. The reception method of claim 10, wherein adaptively adjusting the coefficient and the order of the low-pass filter comprises:
   estimating a Doppler frequency, based on the pilot signal before filtering;
   measuring a signal to noise ratio, based on the filtered pilot signal;
   determining the coefficient of the low-pass filter, based on the Doppler frequency and the signal to noise ratio; and
   determining the order of the low-pass filter using scheduling information.

16. A channel estimation apparatus comprising:
   a pilot detection unit configured to detect a pilot signal from a received signal;
   a low-pass filter configured to filter noise from the pilot signal;
   a channel estimation controller configured to adaptively adjust at least one of a coefficient and an order of the low-pass filter, wherein the coefficient of the low-pass filter is controlled according to characteristics of the pilot signal, and the order of the low-pass filter is controlled based on a group delay of a current low-pass filter being used according to a selected bandwidth; and
   a group delay compensation buffer configured to compensate for group delay caused by the order of the low-pass filter,
   wherein the coefficient of the low-pass filter is determined based on a mean square error associated with at least one of a signal to noise ratio and a Doppler frequency of the pilot signal, and wherein the mean square error is defined as follows:

$$MSE = E\left[\left|\sum_{l=-\infty}^{\infty} g[l]h[n-l] + \sum_{l=-\infty}^{\infty} g[l]v[n-l] - h[n-\Delta]\right|^2\right]$$

$$= \sigma_h^2 \left( \sum_{k=-\infty}^{\infty}\sum_{l=-\infty}^{\infty} g[k]g[l]J_0(2\pi f_d(k-l)T_s) + J_0(0) + \frac{\sigma_v^2}{\sigma_h^2}\sum_{k=-\infty}^{\infty} g^2[k] - 2\sum_{k=-\infty}^{\infty} g[k]J_0(2\pi f_d(k-\Delta)T_s) \right)$$

where, $\Delta$ denotes the group delay of the low-pass filter, $T_s$ denotes a distance between input samples, $\sigma_h^2$ and $\sigma_v^2$ denote variances of channel energy and noise, $$\frac{\sigma_v^2}{\sigma_h^2}$$

denotes a reciprocal number of the signal to noise ratio, $f_d$ denotes the Doppler frequency, $J_0$ denotes a 0th order Bessel function of a first kind, g[n] denotes the low-pass filter, h[n] denotes a signal component, and v[n] denotes a noise component.

* * * * *